United States Patent [19]

Kawabata et al.

[11] Patent Number: 4,932,452

[45] Date of Patent: Jun. 12, 1990

[54] LOW PROFILE PNEUMATIC RADIAL TIRES

[75] Inventors: Misao Kawabata, Tokorozawa; Hisao Ushikubo; Teruyuki Tominaga, both of Kodaira, all of Japan

[73] Assignee: Bridgestone Corporation, Tokyo, Japan

[21] Appl. No.: 201,159

[22] Filed: Jun. 2, 1988

[30] Foreign Application Priority Data

Jun. 2, 1987 [JP] Japan ............................. 62-137659

[51] Int. Cl.$^5$ ............................................. B60C 3/00
[52] U.S. Cl. ................................. 152/454; 152/209 R; 152/538
[58] Field of Search ....... 152/209 R, 209 A, 209 WT, 152/209 NT, 209 D, 454, 538, 526

[56] References Cited

U.S. PATENT DOCUMENTS

| 3,870,095 | 3/1975 | Tangorra | 152/454 |
| 3,976,115 | 8/1976 | Mirtain et al. | 152/538 X |
| 4,733,706 | 3/1988 | Schmit | 152/209 R |

FOREIGN PATENT DOCUMENTS

| 1803483 | 5/1969 | Fed. Rep. of Germany |  |
| 2814950 | 10/1978 | Fed. Rep. of Germany |  |
| 3612886 | 11/1987 | Fed. Rep. of Germany |  |
| 30806 | 2/1983 | Japan | 152/538 |
| 1085852 | 10/1967 | United Kingdom | 152/538 |

Primary Examiner—Michael W. Ball
Assistant Examiner—Geoffrey L. Knable
Attorney, Agent, or Firm—Sughrue, Mion, Zinn, Macpeak & Seas

[57] ABSTRACT

A low profile pneumatic radial tire comprises at least one carcass ply containing cords arranged substantially at 90° relative to a circumference of a tread, and a belt consisting of at least two belt layers which are composed of metal cords inclined relative to the circumference of the tread and intersected with one another between the adjacent belt layers and which are arranged upon a crown of the carcass. The tread surrounds the crown, and is provided with a pair of circumferential main grooves which are disposed symmetrically with respect to an equatorial plane of the tire and which divide a treading portion of the tread into a central region and axially opposite side regions and which are separated by a distance ranging from 45 to 65% of a maximum width of the tire in the state that the tire is assembled onto a normal rim and inflated at a normal internal pressure. The width of the belt ranges from 110 to 130% of a distance between intersections of an imaginary straight line which tangentially contracts with a top surface of a wear indicator projecting from a bottom of each of the circumferential grooves and which is drawn in parallel with a tire rotary axis and a tire contour line at axially opposite side regions of the tread, and the thickness of a tread rubber at maximum width edges of the tread ranges from 30 to 80% of that at the intersections.

5 Claims, 2 Drawing Sheets

LOW PROFILE PNEUMATIC RADIAL TIRES

BACKGROUND OF THE INVENTION

1. Field of the Invention

The present invention relates to low profile pneumatic radial tires having an aspect ratio of 0.3 to 0.6. Particularly, the invention relates to the configuration and construction of passenger car tires, suitable for use in super high speed running, at axially opposite side regions of treads thereof.

2. Related Art Statement

It is a conventional practice that the configuration and construction of low profile tires having small aspect ratios, which tires are suitable for use in super high speed running, do not greatly differ from those of tires having relatively greater aspect ratios.

That is, the thickness of a tread rubber from a tread surface to an outermost layer of a belt is substantially the same over the entire width of the tread, and the belt comprises two belt layers which are composed of metal cords intersecting with one another between the belt layers and which are arranged corresponding to a ground contact width of the tread. A carcass is turned up from axially inside to outside of the tire.

However, when the tire having the above-mentioned structure and configuration is run at super high speeds, the center region of the tread is more likely to wear. The tread wears in a flat fashion, that is, the worn surface of the tread is a surface substantially in parallel with a rotary axis of the tire. As a result, the amount of tread wear at axially opposite side regions is extremely smaller as compared with that at the tread central region.

This is considered to be caused because the tire of such a type is used under a range of small loads during rotation, centrifugal force during rotation under load is large, and thus the central region of the tread having a greater mass is likely to project axially outwardly from the opposite side region.

After a middle stage wear, the tire of this type has serious problems such as separation at opposite edges of the belt layers, and further burst-out at sidewall portions take place to lower durability of the tire.

SUMMARY OF THE INVENTION

It is therefore an object of the present invention to provide a novel configuration and construction of tires at axially opposite side regions of treads which can advantageously solve the above-mentioned problems.

The present inventors have made various examinations upon the causes of problems such as separation at the axially opposite side portions of the belt and burst-out at the sidewall portions particularly during the wearing middle stage. As a result, they found out the following facts.

That is, since the tire of this type undergoes particular wearing at the central region, the mass of the tread rubber at the tread central region becomes smaller after wearing middle stage. On the other hand, the mass of the tread rubber at the axially opposite side portions of the tread, particularly, at the axially opposite edge portions of the belt layers is the same as that in the wearing initial stage. Therefore, the axially opposite side portions of the tread are relatively more greatly pulled radially outwardly due to centrifugal force. Consequently, strain concentrates at the axially opposite edges of the belt during rotation under load and heat is generated at that time. In addition, a main body and a turn-up end portion of the carcass at the sidewall portion are shear-deformed relative to each other due to a small elastic modulus of the carcass main body to induce separation at the turn-up end portion of the carcass ply. Moreover, the separation is further developed to cause the burst-out at the sidewall portions. In view of the above, the present inventors have found out that the above-mentioned problems can effectively be avoided by lessening difference in the mass of the tread rubber between the central region and the axially opposite side regions of the tread after the wearing middle stage, that is, reducing the mass of the tread rubber at the axially opposite side regions, increasing a retaining effect at the axially opposite side regions of the tread, and simultaneously reducing elongation of the carcass at the sidewall portions.

According to the present invention, there is a provision of a low profile pneumatic radial tire comprising at least one carcass ply containing cords arranged substantially at 90° with respect to a circumference of a tread. A belt has at least two belt layers which are composed of metal cords inclined relative to the circumference of the tread at a small angle and intersecting with one another between the belt layers and which are arranged upon a crown zone of the carcass, A pair of circumferential main grooves are provided in the tread surrounding the crown zone, and disposed symmetrically with respect to an equatorial plane of the tire. These grooves divide the surface of the tread into a central region and axially opposite side regions. A distance between the circumferential main grooves is in a range from 45 to 65% of the maximum width of the tire in the state that the tire is assembled onto a normal rim and inflated at a normal internal pressure. The width of the belt is in a range from 110 to 130% of a distance between intersections of an imaginary straight line which tangentially contacts with a top surface of a wear indicator provided in a form projecting from a bottom of each of the circumferential grooves and which is drawn in parallel with a tire rotary axis and a tire contour line at the axially opposite side regions of the tread, and the thickness of a tread rubber at the maximum width edges of the belt is in a range from 30 to 80% of that at the intersections.

As a preferred embodiment of the low profile pneumatic radial tire according to the present invention, it is recommended that the thickness of the tread rubber at each of the tread side regions gradually becomes smaller toward the axially edges of the tread.

These and other objects, features and advantages of the present invention will be appreciated upon reading of the following description of the invention when taken in conjunction with the attached drawings, with the understanding that some modifications, variations and changes of the same could be made, by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

Figure 1:
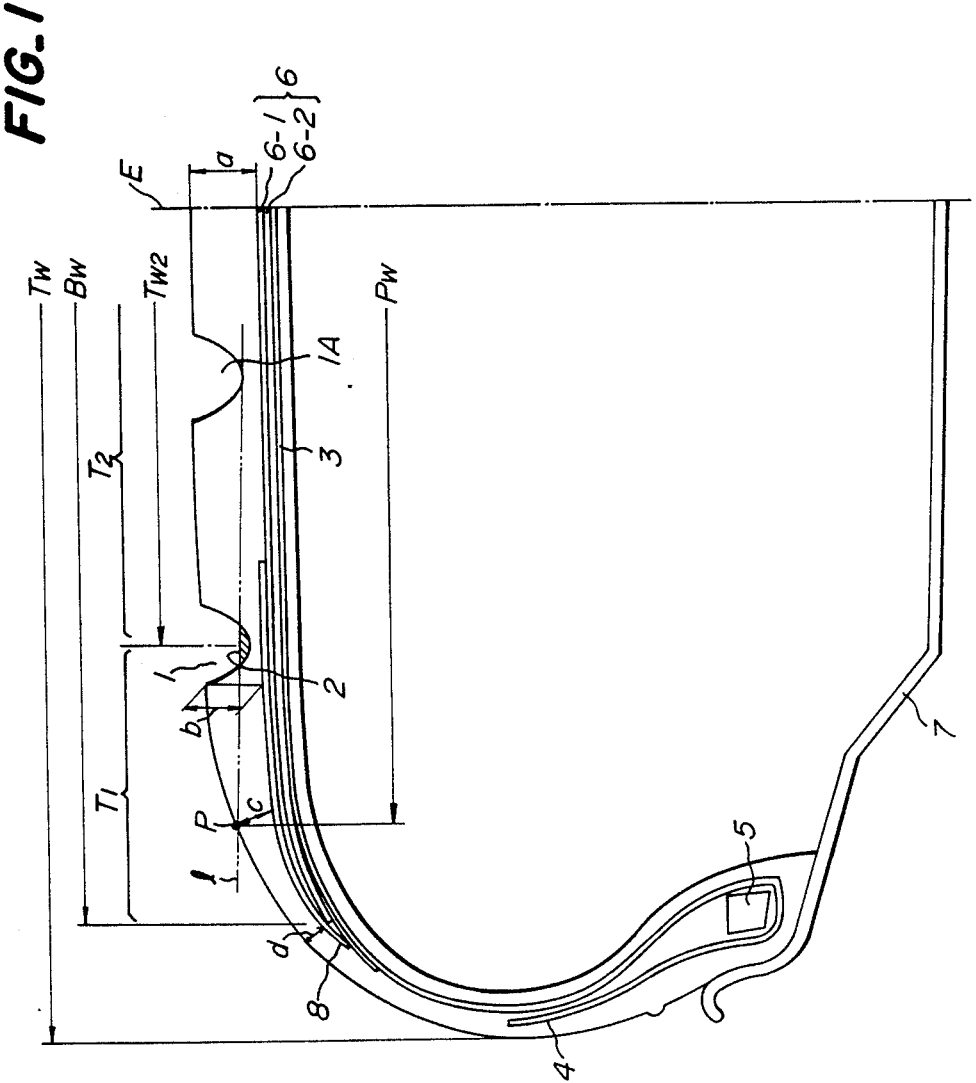
FIG. 1 is a sectional view of a tire according to the present invention.

FIG. 1 is a sectional view of a tire according to the present invention in which a reference numeral 1 denotes one of a pair of circumferential main grooves disposed symmetrically with respect to an equatorial plane E of the tire and dividing a surface of a tread into opposite side regions $T_1$ and a central region $T_2$. A reference numeral 1A denotes a circumferential groove arranged in the central region $T_2$. Reference numerals 2 and 3 denote a wear indicator formed on the bottom portion of the circumferential main groove 1 and a carcass composed of a single ply, respectively. Reference numerals 4, 5, and 6 denote a turn-up ply, a bead core, and a belt consisting of a first belt layer 6-1 and a second belt layer 6-2, respectively. Reference numerals 7 and 8 denote a rim and a reinforcing layer, respectively. As a carcass-reinforcing material, use may be made of cords represented by textile fibers made of rayon, nylon, polyester, and aromatic polyamide (known as trade name Kevlar). In the present invention, use of Kevlar cords is particularly effective.

The distance between the circumferential main grooves 1, that is, the width $Tw_2$ of the central region $T_2$, is set in a range from 45 to 65% of the maximum width Tw of the tire in the state that the tire is assembled onto a normal rim and is inflated at a normal internal pressure.

The width Bw of the belt 6 at a region where cords of the first layer 6-1 and the second layer 6-2 intersect with one another is set in a range from 110 to 130%, preferably in a range from 115 to 125% of a distance Pw between intersections P of an imaginary straight line l which tangentially contacts with the top surface of a wear indicator 2 and which is drawn in parallel with a rotary axis of the tire and a contour line of the tire at the side regions $T_1$.

The thickness d of the tread rubber (hereinafter referred to briefly as "thickness") at edges of the belt 6 at the maximum width is set in a range from 30 to 80%, preferably in a range from 40 to 60% of the thickness c at the intersections P. Further, the thickness in the side region $T_1$ is preferably gradually decreased toward the edge of the tread. That is, assuming that the thicknesses at the center of the tire and at the side region $T_1$ adjoining the circumferential main groove 1 are a and b, respectively, it is desirable to satisfy the relation of $a > b > c > d$.

The reason why the distance between the circumferential main grooves 1 is set in a range from 45 to 65% of the maximum width of the tire as mentioned above is that if it is less than 45% or more than 65%, it leads to problems during running on dry roads or wet roads, respectively.

The reason why the width Bw of the belt is set in a range from 110 to 130% of the distance Pw between the intersections P is that if it is less than 110%, no retaining effect can be expected at the side regions $T_1$. Consequently, since the shoulder portion expands due to a centrifugal force during rotating of the tire when the retaining effect is reduced, the carcass at the sidewall portion expands and the relative strain between the carcass main body and turn-up end portion becomes greater. As a result, strain concentrates upon the ply end at the turn-up portion to cause separation. On the other hand, if the Bw is more than 130% of Pw, the radius of curvature of the belt becomes so great that strain is likely to concentrate upon the edge portions of the belt during rotating under load and thus separation is likely to occur. Accordingly, Bw is set in a range from 110 to 130% of Pw.

In order to enhance the retaining effect at the side regions of the tread, it is effective that at least one reinforcing layer 8 composed of organic fiber cords arranged substantially in parallel with the tire equatorial plane is added, which adjoins the belt and covers the edge portions thereof while extending along the tread portion and that side edges of the thus added reinforcing layer is set in a range from 65 to 85%, more preferably in a range from 70 to 80% of the height of the tire from a rim.

Further, the reason why the thickness d at the maximum width edge of the belt is set in a range from 30 to 80% of the thickness c at the intersections P is that if it is less than 30%, the thickness at the edge portions of the belt is so small that strain concentrates upon the edge portions of the belt during acute turning and that the belt may dangerously be exposed outside due to wearing. On the other hand, if it is more than 80%, the temperature of the tire increases due to heat generation, the weight of the tread portion increases, the side regions expand radially outward due to a centrifugal force, and strain concentrates upon the edge portions of the belt and the ply end of the turn-up portion. Thus, the thickness d is set in a range from 30 to 80% of the distance between the intersections P.

A test tire having a tire size of 255/40 VR 17 (aspect ratio: 0.4) was prepared according to the tire construction shown in FIG. 1. The tread pattern was a block pattern combined with circumferential main grooves.

Turning to the tire configuration, the distance between the circumferential main grooves 1 was set at 52% of the maximum width of the tire (255 mm), the maximum width Bw of the belt 2 was 120% of the distance Pw between the intersections P (205 mm), and the thicknesses of the tread were a=11 mm, b=10 mm, c=7 mm, and d=5 mm.

The carcass was composed of organic fiber cords (trade name Kevlar, 1500 d/2) arranged at 90° with respect to a tread circumference. Steel cords were used in the belt in the state that they were inclined at 24° with respect to the tread circumference. The tire was assembled on a rim of 8.5×17 inches.

Figure 2:
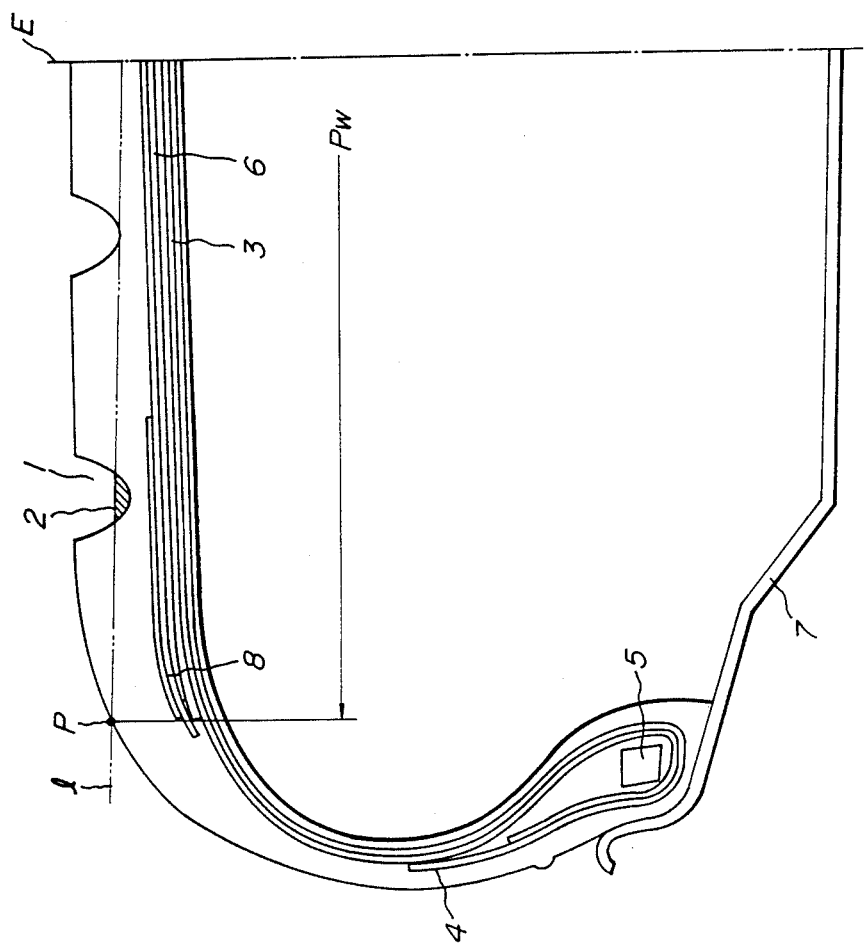
FIG. 2 is a sectional view of a tire according to a conventional technique.

For comparison purpose, a tire having the same tire size according to a conventional construction illustrated in FIG. 2 was used. The maximum width of the belt of this tire was 100% of the distance between the intersections P, and the thickness of a tread rubber at belt edges was 95% of that at the intersections P.

The above two tires were subjected to high speed durability tests under the following conditions.

| | |
|---|---|
| Tire worn amount | 50% |
| Tire internal pressure | 2.5 kg/cm² |
| Speed | successively raised stepwise starting by 10 km/hr once from 100 km/hr |
| Load | 500 kg |

The time of each wear at which the tire amount reached 50% was determined.

A result of the tire according to the present invention was indicated as 130 by index by taking that of the conventional tire as 100. Thus, it was confirmed that the former had excellent durability at high speeds.

According to the low profile pneumatic radial tires of the present invention, separation at the belt and burst-out at the sidewall portions can advantageously be avoided, so that durability at high speeds which is required for the tires of this type can be improved.

What is claimed is:

1. A low profile pneumatic radial tire comprising: at least one carcass ply containing cords arranged substantially at 90° with respect to a circumference of a tread, a belt having at least two belt layers which are composed of metal cords inclined relative to the circumference of the tread and which are arranged upon a crown portion of the carcass with the metal cords being intersected with one another between the belt layers, at least one reinforcing layer composed of organic fiber cords arranged substantially in parallel with the equatorial plane adjoining said belt and covering at least edge portions thereof; said tread surrounding the crown portion and being provided with a pair of circumferential main grooves disposed symmetrically with respect to an equatorial plane of the tire and dividing the tread into a central region and axially opposite side regions, a distance between the circumferential main grooves being in a range from 45 to 65% of a maximum width of the tire in the state that the tire is assembled onto a normal rim and inflated at a normal internal pressure, wherein the width of the belt is in a range from 110 to 130% of a distance between intersections of an imaginary straight line which tangentially contacts with a top surface of a wear indicator provided in a form projecting from a bottom of each of the circumferential grooves and is drawn in parallel with a tire rotary axis and a tire outer contour line at axially opposite side regions of the tread, said tire having an aspect ratio of 0.3 to 0.6 and wherein a thickness relationship of rubber in said tread satisfying the relationship $a > b > c > d$ where as is the thickness of the tread rubber at the central region adjacent the centerline of said tire, b is the thickness of the tread rubber at the side region adjacent to an outer one of said circumferential main grooves, c is the thickness of the tread rubber at said intersection of the imaginary straight line and the outer contour line and d is the thickness of the tread rubber at the maximum edge of said belt, and wherein d is 40–60% of c.

2. A low profile pneumatic radial tire according to claim 1, wherein the width of the belt is in a range from 115 to 125% of the distance between the intersections.

3. A low profile pneumatic tire according to claim 1 wherein said reinforcing layer extends over an outer belt layer covering an edge portion thereof and terminates in a shoulder portion of said tire at a height in the range of 65–85% of the height of said tire measured from said rim.

4. A low profile pneumatic tire according to claim 3 wherein said height is 70–80% of said tire measured from said rim.

5. A low profile pneumatic tire according to claim 1 wherein said carcass cords are aromatic polyamide and said metal cords in said belt layers are steel.

* * * * *